Patented Nov. 13, 1945

2,388,991

UNITED STATES PATENT OFFICE 2,388,991

PRODUCTION OF CASEIN

William F. Oatman, Geneva, Ill., assignor to Hercules Powder Company, Wilmington, Del., a corporation of Delaware No Drawing. Application February 18, 1942, Serial No. 431,340

8 Claims. (Cl. 260—120)

This invention relates to the production of casein from skim milk powder and more particularly to the production of acid or rennet casein from spray or roller-dried skim milk powder.

The production of casein from skim milk powder instead of from liquid skim milk has been found to be desirable in particular commercial plants during periods of low milk volume in that area, during periods of low market price for the powder, and in areas where the transportation of the whole skim milk is difficult or expensive.

For the purposes of human consumption, skim milk powder has an advantage over fresh milk in that the curd from the powder is much softer than the curd from fresh milk and hence is more easily digested. This same principle of producing soft curd is a difficulty which had to be overcome in order to make possible the use of skim milk powder for the commercial production of casein. Skim milk powder has been mixed with water to give a percentage solids content comparable to skim milk and the casein precipitated with sulfuric acid at temperatures and acidities which would have produced tough curd with skim milk. However, the curd in this case is soft and entirely unsuited for casein for ordinary commercial uses.

Now, in accordance with this invention, it has been found that a tough casein may be produced from skim milk powder which has been diluted with skim milk or with mixtures of skim milk and water. It has been found that the most desirable product is obtained when the skim milk powder is diluted with from about 10 to 20 times its weight of skim milk or mixtures of skim milk and water. The skim milk may be diluted with varying amounts of water, but it has been found most desirable that the amount of water should not exceed its equal weight of skim milk. In the present specification and in the appended claims, the term "skim milk" as applied to skim milk in the liquid state is intended to refer to both the undiluted skim milk and the skim milk which has been diluted with up to an equal weight of water.

The resulting mixture of dried skim milk powder in skim milk, with or without additional water, may be precipitated with any of the ordinary casein precipitating agents such as rennet or an acid such as sulfuric acid, hydrochloric acid, lactic acid, sour whey, etc. The conventional precipitating conditions may be used, but it has been found to be preferable to employ particular precipitating conditions depending upon the precipitating agent.

Thus, when rennet is used as the precipitating agent, best results are obtained by precipitating the casein from the blend of dried skim milk powder and skim milk at a temperature of about 95° F., the rennet being used in such a proportion as to complete setting to a firm curd in about 15 minutes. At the expiration of this time, the curd is separated from the whey in the usual manner, washed and the casein recovered therefrom in the conventional way. The set of the curd should be considerably firmer than with skim milk alone, this being due to the high solids content of the mixture of dried skim milk powder and skim milk. The curd may be washed in the normal manner, i. e., once with lukewarm water, then with water at about 150° F., and then with two washes of cold water. The resulting casein is comparable to rennet casein from fresh skim milk, particularly as regards free acidity, ash content, odor, and dirt content.

When a mineral acid is used as the precipitating agent, such as for example sulfuric acid, best results are obtained by precipitating at a temperature of about 130° F. at a pH of from about 5.0 to about 5.2. Following precipitation under these conditions, the curd is washed and the casein recovered in the conventional manner.

While spray-dried skim milk powder appears to give the highest quality casein product, the process has been successfully carried out using roller-dried skim milk powder.

The yield of casein in accordance with the process of the present invention is substantially normal, i. e. equal to that which should be obtained if fresh skim milk in comparable amount were employed as the raw material. Yields of from 2.5% to 3.0% were obtained based upon the weight of the fresh skim milk equivalent to the skim milk and dried skim milk employed as the raw materials.

It has also been found desirable in order to aid in the coagulation of the mixture of skim milk powder and skim milk with or without water to add a small amount of calcium salt. Addition of 0.1% to 0.5% by weight of calcium chloride or other calcium salt was found to aid the coagulation.

*Example I*

Six hundred pounds of spray-dried skim milk powder were mixed with 6,000 pounds of fresh skim milk. The curd was precipitated with 16 ounces of rennet extract at a temperature of 95°

F. and the setting to a firm curd was accomplished in about 15 minutes. At the expiration of this time, the curd was separated from the whey in the usual manner, then washed with lukewarm water, washed again with water at 150° F., and finally with two cold water washes. The quality of the rennet casein produced, particularly as regards free acidity, ash content, odor, and dirt content was comparable to the best quality rennet casein from skim milk.

Example II

Fifty pounds of spray-dried skim milk powder were mixed with 1,000 pounds of fresh skim milk. The curd was precipitated with sulfuric acid which was added until the pH of the mixture reached 5.0 and at a temperature of 140° F. The curd was separated and washed in the same manner as in Example I. The curd produced was quite firm.

Example III

Six hundred pounds of roller-dried skim milk powder were mixed with 6,000 pounds of fresh skim milk. The curd was precipitated with 16 ounces of rennet extract at a temperature of 95° F. and the setting to a firm curd was accomplished in about 15 minutes. The separation and washing were carried out as in Example I. While the color of the product was not as desirable as that obtained from the spray-dried skim milk powder, the odor and dirt content were about the same and there was a slightly less percentage of ash.

Example IV

Fifty pounds of roller-dried skim milk powder were mixed with 500 pounds of fresh skim milk and 500 pounds of water. The curd was precipitated with sulfuric acid which was added until the pH reached 5.1. The separation and washing was carried out as in Example I. The resultant curd was tough.

The present invention enables the casein producer to offset fluctuations in normal skim milk volume by the use of dried skim milk powder when the volume of skim milk is low in the area. The dried skim milk powder may be stored until such periods occur. Also, in certain areas, the cost of hauling skim milk may be so high as to make it more desirable to make dried skim milk powder and ship it instead of the skim milk itself. Furthermore, by the use of this process, there is a higher concentration of solids in the whey and therefore the cost of evaporation to recover these solids is less at the casein plant. Numerous other advantages of the process over the present invention will be apparent to those skilled in the art.

What I claim and desire to protect by Letters Patent is:

1. The process of obtaining casein in the form of a firm curd from dried skim milk powder which consists in mixing dried skim milk powder with fresh skim milk, precipitating casein by adding to the mixture a casein-precipitating agent selected from the group consisting of acids, sour whey, and rennet, and recovering from the mixture precipitated casein in the form of a firm curd.

2. The process of obtaining casein in the form of a firm curd from dried skim milk powder which consists in mixing dried skim milk powder with from about 10 to about 20 times its weight of fresh skim milk, precipitating casein by adding to the mixture a casein-precipitating agent selected from the group consisting of acids, sour whey, and rennet, and recovering from the mixture precipitated casein in the form of a firm curd.

3. The process of obtaining casein in the form of a firm curd from spray-dried skim milk powder which consists in mixing spray-dried skim milk powder with fresh skim milk, precipitating casein by adding to the mixture a casein-precipitating agent selected from the group consisting of acids, sour whey, and rennet, and recovering from the mixture precipitated casein in the form of a firm curd.

4. The process of obtaining casein in the form of a firm curd from spray-dried skim milk powder which consists in mixing spray-dried skim milk powder with from about 10 to about 20 times its weight of fresh skim milk, precipitating casein by adding to the mixture a casein-precipitating agent selected from the group consisting of acids, sour whey, and rennet, and recovering from the mixture precipitated casein in the form of a firm curd.

5. The process of obtaining casein in the form of a firm curd from skim milk powder which consists in mixing skim milk powder with from about 10 to about 20 times its weight of fresh skim milk, precipitating casein by adding to the mixture a casein-precipitation acid, and recovering from the mixture precipitated casein in the form of a firm curd.

6. The process of obtaining casein in the form of a firm curd from dried skim milk powder which consists in mixing dried skim milk powder with from about 10 to about 20 times its weight of fresh skim milk, precipitating casein by adding sour whey to the mixture, and recovering from the mixture precipitated casein in the form of a firm curd.

7. The process of obtaining casein in the form of a firm curd from dried skim milk powder which consists in mixing dried skim milk powder with from about 10 to about 20 times its weight of fresh skim milk, precipitating casein by adding rennet to the mixture, and recovering from the mixture precipitated casein in the form of a firm curd.

8. The process of obtaining casein in the form of a firm curd from spray-dried skim milk powder which consists in mixing spray-dried skim milk powder with fresh skim milk, precipitating casein by adding to the mixture a casein-precipitating acid, and recovering from the mixture precipitated casein in the form of a firm curd.

WILLIAM F. OATMAN.